United States Patent
Pierrot, III

[15] 3,693,679
[45] Sept. 26, 1972

[54] DELIMBING AND TOPPING BLADE CONTROL LINKAGE

[72] Inventor: Victor Charles Pierrot, III, Dubuque, Iowa

[73] Assignee: Deere & Company, Moline, Ill.

[22] Filed: April 16, 1971

[21] Appl. No.: 137,155

[52] U.S. Cl. .............................................. 144/2 Z
[51] Int. Cl. ............................................. A01g 23/02
[58] Field of Search ....... 144/2 Z, 3 D, 34 R, 309 AC

[56] References Cited

UNITED STATES PATENTS

| 3,618,647 | 11/1971 | Stuart | 144/309 AC |
| 3,620,272 | 11/1971 | Eriksson et al. | 144/3 D |

*Primary Examiner*—Gerald A. Dost
*Attorney*—H. Vincent Harsha, Harold M. Knoth, William A. Murray, John M. Nolan and Jimmie R. Oaks

[57] ABSTRACT

A delimbing machine includes an elongate horizontal platform on which full-length trees are placed and along which a blade-carrying carriage is propelled to delimb and then cut the top from a tree stem. The delimbing blades are spring-biased into encirclement of a tree stem and cams mounted on the opposite ends of the platform operate a crank to cause the blades to open to permit a tree to be delimbed to be placed for encirclement by the blades and to permit a delimbed tree to be removed from the blades. The topping blades are also spring-biased toward engagement with the tree stem but are held away from the tree stem by an overcenter linkage which is moved overcenter by a linkage connected to the crank arm for opening the delimbing blades when the delimbing blades reach a predetermined small diameter near the top of the tree stem.

5 Claims, 3 Drawing Figures

INVENTOR.
V. C. PIERROT, III

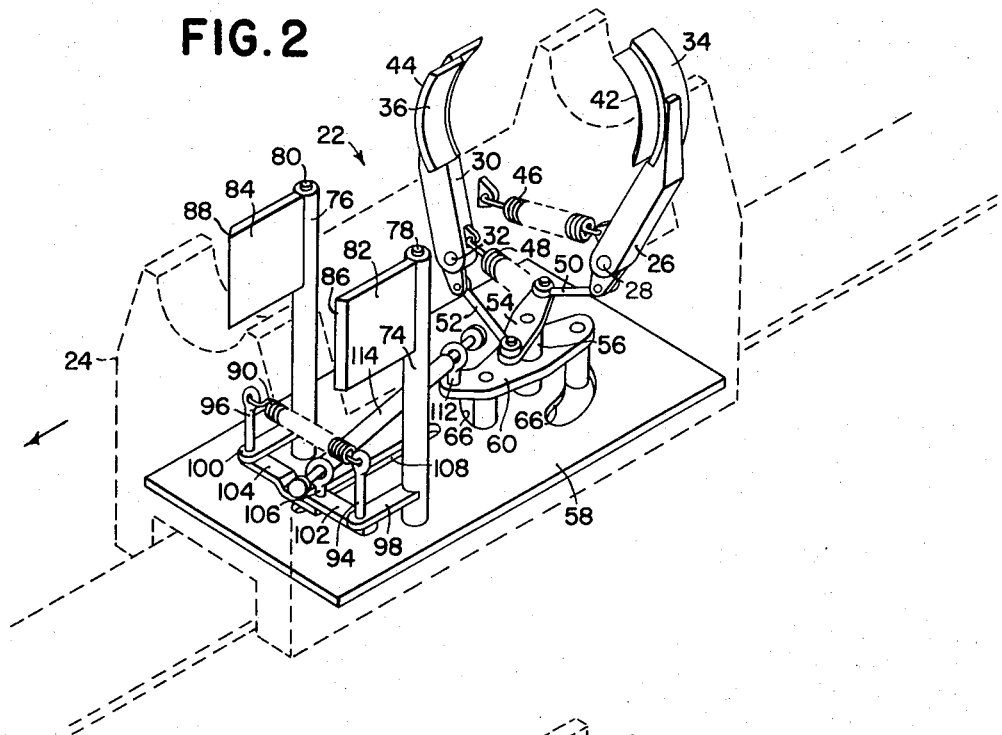

3,693,679

1

DELIMBING AND TOPPING BLADE CONTROL LINKAGE

BACKGROUND OF THE INVENTION

The present invention relates to a mechanism for delimbing and topping a tree stem positioned along a platform or track and more particularly relates to delimbing and topping blade arrangement having their controls interrelated and being mounted on a carriage which is driven along a platform to first delimb and then to top a tree stem.

It is known to interrelate the controls of delimbing and topping blades, however, the known arrangements lack overall simplicity and reliability.

SUMMARY OF THE INVENTION

According to the present invention there is provided a novel delimbing and topping blade arrangement mounted on and for movement with a carriage.

An object of the invention is to provide a blade arrangement wherein the delimbing and topping blades are biased to closed, cutting positions and are movable to open non-cutting positions by common linkage means operated by the inertia of the carriage as it moves along the supporting platform.

A more specific object is to provide a linkage means of the type mentioned in the immediately preceding paragraph including an overcenter topping blade linkage for holding the topping blades open and including a link responsive to the movement of the delimbing blades toward each other, when following the decreasing diameter of a tree stem during delimbing the stem from its bottom to its top, for moving the topping blade overcenter when the delimbing blades are at a predetermined diameter of the tree stem.

Still another object is to provide delimbing and topping blade control linkage means which are simple and reliable.

These and other objects will be apparent from the ensuing description and the appended drawings.

BRIEF DESCRIPTION OF THE DRAWINGS

FIG. 2 is a perspective view of the delimbing and topping blade carriage, showing the outline of the frame of the carriage in dashed lines and showing parts broken away for clarity.

FIG. 3 is a view similar to FIG. 2 but showing parts removed for exposing the relationship of the cam and the blade control linkage.

DESCRIPTION OF THE PREFERRED EMBODIMENT

Figure 1:
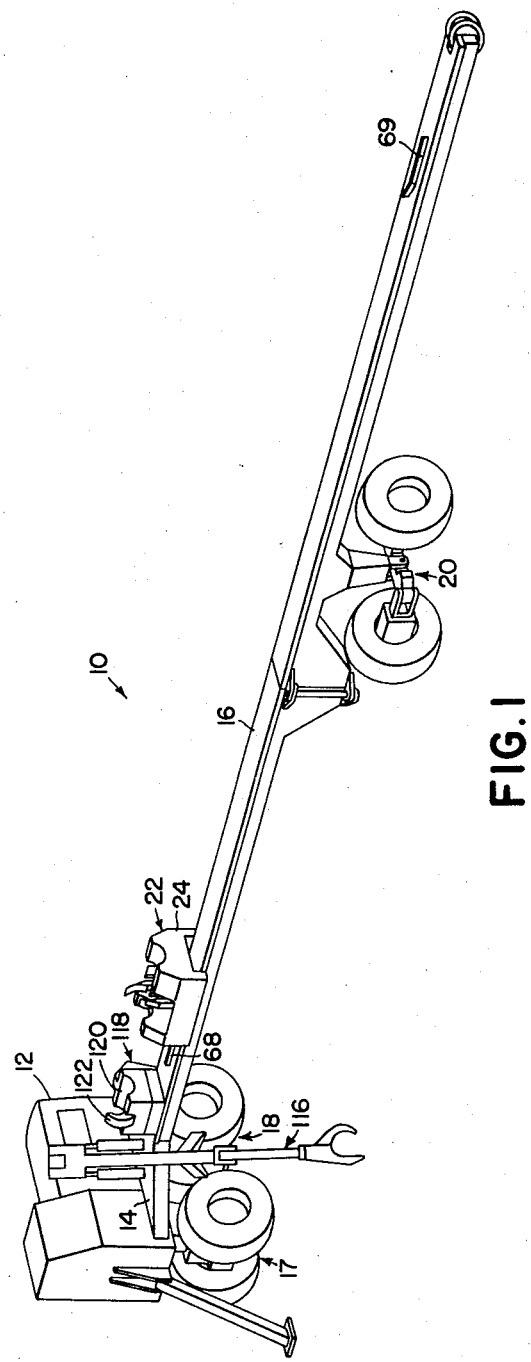
FIG. 1 is an overall perspective view of the delimbing machine in which the present invention is embodied.

Referring now to the drawings, there is shown a generally T-shaped, self-propelled delimbing machine 10. The machine 10 includes a power unit 12 forming the head of the machine and having a horizontal frame 14 to which is fixed one end of an elongate, horizontal delimbing platform 16, forming the leg of the machine. The power unit 12 is supported on a pair of dual-wheel assemblies 17 and 18, located under the opposite ends of the frame 14, and the platform 16 is supported intermediate its ends on a third wheel assembly 20.

A delimbing and topping blade carriage 22 is mounted by means, not shown, for guided movement along the platform 16 between delimbing beginning and ending positions respectively adjacent the near and far ends of the platform 16, relative to the power unit 12. A drive means, not shown, is operatively connected to the carriage 22 for reversibly driving the latter along the platform 16. The carriage mounting and drive means form no part of the present invention and for the details thereof reference may be had to the copending application Ser. No. 120,501, having the same assignee as the present application, and filed by French et al. on Mar. 3, 1971.

The carriage 22 includes a main frame 24 overlying and having skirts straddling the platform 16. The carriage 22, as viewed moving forwardly in the direction of the arrow (FIG. 2) by an observer at the power unit 12, has a first blade-carrying arm 26 mounted at the left side of the frame 24 for swinging about a fore-and-aft pivot axis defined by a pin 28 located adjacent the trailing end of the carriage 22. A second blade-carrying arm 30 is similarly mounted at the right side of the frame 24 for swinging about a fore-and-aft pivot axis defined by a pin 32, the pins 28 and 32 being spaced from each other in the fore-and-aft direction an amount sufficient for permitting the arms 26 and 28 to swing to overlapped positions. Respectively carried on the outer ends of the arms 26 and 30 are a pair of arcuate plate-like blades 34 and 36 respectively having opposed concave surfaces 38 and 40 for embracing a tree stem and having beveled leading cutting edges 42 and 44 for cutting tree limbs by impact. The blades 34 and 36 are biased toward each other, for embracing a fore-and-aft extending tree stem located therebetween, by a pair of tension springs 46 and 48. The spring 46 has its opposite ends connected to the right side of the frame 24 and the arm 26 and the spring 48 has its opposite ends connected to the left side of the frame 24 and the arm 30.

For the purpose of opening the blades 34 and 36 against the bias of the springs 46 and 48, there is provided linkage means including a pair of tie rods 50 and 52 respectively pivotally connected at one of their ends to the arms 26 and 30 and respectively pivotally connected at the other of their ends to the opposite ends of a horizontal output crank arm 54. The crank arm 54 is fixed, midway of its ends, to a vertically extending crank pin 56 which is rotatably journaled in a horizontal mounting plate 58 forming the bottom of the frame 24. A horizontal input crank arm 60 is fixed between its ends, to the crank pin 56 and a pair of rollers 62 are respectively mounted for rotation about a pair of vertical pins 64 fixed to and extending downwardly from the crank arm 60 at locations equidistant from the crank pin 56. The pair of rollers 62 are respectively received in and extend through a pair of kidney-shaped openings 66 in the mounting plate 58. A pair of vertical surface cams 68 and 69 are fixed to the top of the platform 16 respectively at the delimbing beginning and ending positions, of the carriage 22, adjacent the near and far ends of the platform 16. The cams 68 and 69 each include first surface portions 70, extending in the direction of travel of the carriage 22, and second surface portions 72 angled to the direction of travel. The cams 68 and 69 are each fixed to the platform 16 such that as the carriage 22 respectively arrives at the cams 68 and 69, the rollers 62 first contact the angled surface portions 70, which cause the input crank arm 60 and, hence, the output crank arm 54 to be rotated to an extreme counterclockwise position (FIGS. 2 and 3) wherein the delimbing blades 34 and 36 are moved apart to their fully open position. The cam surface portions 72 receive the rollers 62 from the angled cam surface portions 70 and the rollers 62 bear thereagainst to prevent the blades 34 and 36 from closing.

Mounted adjacent the leading end of the carriage 22 are a pair of vertical topping blade mounting posts 74 and 76. The posts 74 and 76 are tubular and are respectively pivotally received on a pair of rods 78 and 80 fixed to and extending vertically upwardly from the mounting plate 58. Respectively fixed to the upper ends of the posts 74 and 76 are a pair of flat plate-like topping blades 82 and 84 having respective beveled cutting edges 86 and 88. The blades 82 and 84 pivot about the rods 78 and 80 between an open position wherein they extend parallel to each other and the direction of travel, as illustrated in FIG. 2, and a closed topping position wherein they extend perpendicular to the direction of travel and their cutting edges 86 and 88 meet.

The blades 82 and 84 are biased toward the closed position by means of a tension spring 90 having its opposite ends respectively connected to eyes forming the tops of a pair of pins 94 and 96 respectively extending vertically through a pair of horizontal crank arms 98 and 100 fixed to the posts 74 and 76. Respectively pivoted to the bottom of the pins 94 and 96 are one of the ends of a pair of links 102 and 104 having their other ends pivotally interconnected by means of a vertical pin 106. The bottom end of the pin 106 is received in a narrow fore-and-aft extending, centrally located guide slot 108 in the mounting plate 58. The pin 106 is movable between a first position at the leading end of the slot 108 wherein it is slightly forwardly of the line joining the centers of the pins 94 and 96 and wherein the links 102 and 104 are prevented from being folded by the spring 90 and a second position in the slot 108 rearwardly of the line joining the centers of the pins 94 and 96 wherein the links 102 and 104 are caused to be folded by the spring 90 resulting in the blades 82 and 84 being pivoted counterclockwise and clockwise, respectively. For the purpose of shifting the pin 106 to the opposite sides of the line intersecting the centers of the pins 94 and 96, a control rod 110 is slidably received in an eye forming the top of the pin 106 and in an eye forming the top of a vertical pin 112 swivelly mounted at the leading end of the input crank arm 60. At the opposite ends of the control rod 110 are abutments for preventing the rod 110 from being withdrawn from the eyes of the pins 106 and 112 and for being respectively engaged by the eye of the pin 112 and for engaging the eye of the pin 106 to transfer counterclockwise motion of the input crank arm 60 into linear motion for shifting the pin 106 to the position rearwardly of the center line intersecting the pins 94 and 96. An elongate tubular control collar 114 is slidably received on the rod 110 between the eyes of the pins 106 and 112 and its opposite ends are respectively positioned for being engaged by the eye of the pin 112 and for engaging the eye of the pin 106 to transfer clockwise motion of the input crank arm 60 into linear motion for shifting the pin 106 to the position forwardly of the centerline intersecting the pins 94 and 96.

A boom and grapple assembly 116 is mounted on the frame 14 adjacent the end of the delimbing platform 16 and is hydraulically operable, in the usual manner, for grasping and manipulating tree stems into place of the platform 16. A retainer-ejector 118 is mounted on the platform 16 adjacent the boom and grapple assembly 116 and includes a bed 120 which supports the stems of trees placed of the platform 16 and against which such stems are clamped by a hydraulically-controlled clamp arm 122.

In operation, the delimbing machine 10 is driven to a position alongside a tree or a pile of trees, to be delimbed, lying on the ground. The carriage drive means (not shown) is appropriately controlled to move the carriage 22 to its beginning location over the cam 68 at the near end of the platform, as shown in FIGS. 2 and 3. In this position of the carriage 22, the rollers 62 are in engagement with the cam surface portion 72 whereby the input crank arm 60 is held in its extreme counterclockwise position wherein the delimbing blades 34 and 36 and the topping blades 82 and 84 are held open by linkage associated with the crank arm 60.

The operator then controls the boom and grapple assembly 116 to select and manipulate a tree stem into position along the top of the platform 16 with the top of the tree being at or beyond the far end of the platform 16 and with the bottom portion of the tree resting on the bed 120 and located between the open pairs of delimbing and topping blades 34 and 36, and, 82 and 84, respectively. The clamp arm 122 is then actuated to clamp the tree stem against the bed 120 t0 hold the stem during the delimbing and topping operations.

At this time, the carriage drive is actuated to quickly advance the carriage 22 forwardly in the direction of the arrow (FIG. 2), toward the far end of the platform 16. As the carriage 22 moves from over the cam 68, the leading one of the rollers 62 first becomes free of the cam surface portion 70 and the crank arm 62, through the action of the delimbing blade biasing springs 44 and 46, rotates clockwise as permitted by the angled cam surface portion 72 or until one of the delimbing blades 34 and 36 comes into contact with the tree stem.

As the carriage proceeds from the bottom to the top of the tree stem, the springs 44 and 46 tend to keep the concave surfaces 38 and 40 of the delimbing blades 34 and 36 in embracing relationship with the tree stem so as to dispose the sharpened leading edges 42 and 44 as closely as possible to the tree stem so as to cut the limbs off at their juncture with the tree stem.

Since tree stems are naturally tapered from their bases to their tops, the blades 34 and 36 will move closer together and the input crank arm 60 will continue to be rotated clockwise by the action of the springs 44 and 46, as the carriage 22 advances toward the far end of the platform and thus toward the top of the tree stem. As the input crank arm 60 rotates clockwise, the eye at the end of the pin 112 slides rearwardly on the control rod 110 until it engages the abutment on the trailing end of the rod 110 and then it causes the rod 110 to slide rearwardly until the abutment at the leading end of the rod 110 engages the eye of the pin 106. At this point, further clockwise rotation of the input crank arm 60 results in the pin 106 being moved rearwardly in the guide slot 108. When the delimbing blades 34 and 36 engage a predetermined diameter portion of the tree stem, the control linkage is designed such that the pin 106 is moved rearwardly of the centerline joining the pins 94 and 96 and the action of the tension spring 90 collapses the links 102 and 104 and rotates the topping blade-carrying posts 74 and 78 to swing the topping blades 82 and 84 to the closed position to engage their cutting edges 86 and 88 with the tree stem. The movement of the carriage 22 then causes the angled blades to "bite" into the tree stem and continue rotating together to remove the top of the stem.

Meanwhile, the carriage drive means has been operated to cause the carriage 22 to come to a smooth stop at the far end of the platform 16 and as the carriage 22 is stopping its momentum carries it to a position over the cam 69, which cam is engaged by the rollers 62 and causes the input crank arm 60 to be rotated to the extreme counterclockwise position. During the counterclockwise rotation of the crank arm 60, the eye of the pin 112 engages the control collar 114 and slides the collar forwardly on the rod 110 into engagement with the eye of the pin 106 and moves the latter to the leading end of the slot 108. As the pin 106 moves forwardly in the slot 108, it causes the links 102 and 104 to be unfolded resulting in the support posts 74 and 78 being rotated to dispose the topping blades 82 and 84 in the opened position, wherein they extend parallel to each other. It is to be noted that the counterclockwise rotation of the input crank arm 60 has at the same time, through means of the output crank arm 54 and the tie rods 50 and 52, opened the delimbing blades 34 and 36. The delimbed tree stem may then be lifted from between the delimbing blades 34 and 36.

The carriage drive means is then reversed to return the carriage to its beginning location. As the carriage 22 leaves the cam 69, the delimbing and topping blades will again close, as described above, and as the carriage 22 approaches the beginning position over the cam 68 at the near end of the platform 16, the delimbing and topping blades will again be opened in the manner described above.

What is claimed is:

1. A delimbing and topping apparatus comprising: a blade carriage adapted for movement along a guide track positionable lengthwise of a tree stem, said carriage including a frame; a pair of delimbing blades and a pair of topping blades respectively pivotally mounted at opposite sides of said frame for swinging movement toward and away from each other and crosswise to the intended direction of movement of said carriage; biasing means urging each of said pairs of delimbing and topping blades toward each other respectively to delimbing and topping positions; control linkage means connected between said frame and said delimbing and topping blades for moving the respective pairs of the latter away from each other against the action of the biasing means to respective inactive positions for receiving a tree stem in or ejecting a tree stem from a position extending between the pairs of blades in the direction of intended travel of the carriage; said control linkage means including separate delimbing and topping blade-control linkage means respectively including an element movable between first and second positions corresponding to extreme apart and together positions of said pair of delimbing blades and an overcenter linkage movable between first and second overcenter positions at opposite sides of an on-center position respectively for preventing said biasing means from and for permitting said biasing means to move said pair of topping blades from the inactive to the topping position; and lost-motion link means interconnecting said element and said overcenter linkage for moving said overcenter linkage to said first overcenter position when said element is moved to said first position and for moving said overcenter linkage to said second overcenter position when said element is at a predetermined position between said first and second positions.

2. The invention defined in claim 1 wherein said delimbing blade control linkage means includes a crank pin rotatably mounted in said frame, and said element being a crank arm secured to said crank pin.

3. The invention defined in claim 2 wherein said overcenter linkage includes a pair of links pivotally interconnected at one of their ends by a pivot pin and said lost-motion linkage having one end connected to said pivot pin.

4. The invention defined in claim 3 wherein said pivot pin has an eye formed integral therewith; a second pivot pin having an eye integral therewith and being swivelly mounted in said crank arm for movement about an axis parallel to the axis of the crank pin; and said lost-motion linkage means including a rod extending through said eyes of said pivot pins and having abutments at its opposite ends and a collar slidably received on said rod and having its opposite ends located on the opposite sides of said eyes from said abutments; and the rod and collar being dimensioned such that when said crank arm is at said first position, the opposite ends of said collar will be in contact with said eyes and when said crank arm is at said predetermined position said abutments will be in contact with said eyes.

5. The invention defined in claim 3 wherein said overcenter linkage extends generally vertically to the pivotal axes of said topping blades; said frame including a plate positioned adjacent to and extending normally to said pivot pin; a guide slot being located in said plate and extending vertically to a line determining the on-center position of said overcenter linkage and said pivot pin being received for guided movement in said slot.

* * * * *